United States Patent
Shea et al.

(10) Patent No.: US 6,459,358 B1
(45) Date of Patent: Oct. 1, 2002

(54) FLEXIBLE MOLDABLE CONDUCTIVE CURRENT-LIMITING MATERIALS

(75) Inventors: John Joseph Shea, Pittsburgh, PA (US); Miomir B. Djordjevic, Milwaukee, WI (US); William Kingston Hanna, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/406,534

(22) Filed: Sep. 27, 1999

(51) Int. Cl.[7] .................... H01C 07/02; C08L 63/00
(52) U.S. Cl. .................... 338/20; 338/13; 338/22; 252/511; 525/524; 523/427; 523/400; 523/457; 523/458; 523/468
(58) Field of Search .............. 338/13, 20, 22; 252/511, 524, 427, 400, 457, 458, 468

(56) References Cited

U.S. PATENT DOCUMENTS

| | | | |
|---|---|---|---|
| 4,692,499 A | * | 9/1987 | Torrosian et al. |
| 4,772,422 A | | 9/1988 | Hijikata et al. |
| 5,250,228 A | | 10/1993 | Baigrie et al. |
| 5,575,956 A | * | 11/1996 | Hermansen et al. |
| 5,614,881 A | | 3/1997 | Duggal et al. |
| 5,841,111 A | | 11/1998 | Shea et al. |
| 5,859,578 A | | 1/1999 | Arnold |
| 6,191,681 B1 | * | 2/2001 | Cole et al. |

FOREIGN PATENT DOCUMENTS

WO     WO 99/30329     6/1999

OTHER PUBLICATIONS

Fournier Et Al., Positive temperature coefficient effect in carbon black/epoxy polymer composites, Journal of Meterials Science Letters, (1977) pp. 1677–1679, Vol. 16, France.
Strümpler Et Al., Correlation of Electrical, Dielectric and Mechanical Properties of Polymer Composites, Mat. Res. Soc. Symp. Proc., Materials Research Society (1996) pp. 393–398, Vol. 411, Switzerland.

* cited by examiner

Primary Examiner—Robert Dawson
Assistant Examiner—Marc S. Zimmer
(74) Attorney, Agent, or Firm—Martin J. Moran

(57) ABSTRACT

A current limiting PTC device (10) has two electrodes (14) with a thin film of electric conducting polymer material (20) disposed between the electrodes, the polymer material (20) having superior flexibility and short circuit performance, where the polymer material contains short chain aliphatic diepoxide, conductive filler particles, curing agent, and, preferably, a minor amount of bisphenol A epoxy resin.

13 Claims, 2 Drawing Sheets

FLEXIBLE MOLDABLE CONDUCTIVE CURRENT-LIMITING MATERIALS

The Government of the United States of America has rights in this invention, pursuant to Contract No. DE-AC26-98FT40355 with the United States Department of Energy.

BACKGROUND OF THE INVENTION

1. Field of the Invention

This invention relates to flexible, longlife, conductive polymeric material for current-limiting applications with circuit breakers and other electrical apparatus.

2. Background Information

Current limiting polymer compositions which exhibit positive temperature coefficient of resistance (PTC) behavior, and electrical devices comprising current limiting polymer compositions have been widely used. The current limiting polymer compositions generally include conductive particles, such as carbon black, graphite or metal particles, dispersed in a polymer matrix, such as thermoplastic polymer, elastomeric polymer or thermosetting polymer. PTC behavior in a current limiting polymer composition is characterized by the material undergoing a sharp increase in resistivity as its temperature rises above a particular value known as the switching temperature. Materials exhibiting PTC behavior are useful in a number of applications including electrical circuit protection devices in which the current passing through a circuit is controlled by the temperature of a PTC element forming part of that circuit.

Particularly useful devices comprising current limiting polymer compositions are electrical circuit protection devices. Such circuit protection devices usually contain a current limiting polymer device comprised of two electrodes embedded in a current limiting polymer composition. When connected to a circuit, the circuit protection devices have a relatively low resistance under normal operating conditions of the circuit, but are tripped, that is, converted into a high resistance state when a fault condition, for example, excessive current or temperature, occurs. When the circuit protection device is tripped by excessive current, the current passing through the PTC device causes it to self-heat to its switching temperature, $T_s$, at which a rapid increase in its resistance takes place.

U.S. Pat. No. 5,841,111 (Shea, et al.) describes such devices and lists, very generally, as a suggested, useful polymer matrix, all of: polyethylene or propylene copolymers, polyvinyl chloride or fluoride, polyvinylidene chloride or fluoride, polyesters such as poly (ethylene terephthalate), polyamides such as various Nylons, polystyrene polyacrylonitrile, thermoplastic silicones or polyethers, rubbers, elastomeric gums such as polyisoprene, styrene-butadiene random copolymer rubbers, polyacrylate rubbers, siloxanes such as poly (dimethyl siloxane), ethylene-propylene/diene rubbers, epoxy resins made from epichlorohydrin and bisphenol A or epichlorohydrin and aliphatic polyols such as glycerol all usually with amide or amine curing agents, and phenolic resins made from a phenol and an aldehyde; essentially the entire range of resinous materials. Similarly, U.S. Pat. No. 5,614,881 (Duggal, et al.) teaches use of almost any resin in a current limiting device. Other patents describing conductive polymer compositions include U.S. Pat. Nos. 4,772,422 and 5,250,228 (Hijikata, et al. and Baigrie et al. respectively).

U.S. Pat. No. 5,859,578 (Arnold), relating specifically to circuit breakers, describes the polymer current limiter as conductive filler and any polymeric binder with a vaporization temperature such that significant gas evolution occurs below 800° C. However, most previous commercial materials used for current limiting applications in conjunction with low voltage (<600 $V_{ac}$) circuit breakers, generally consisted of a very brittle blend of conductive filler (that is, carbon black) with a binder that was difficult to process, especially to mold. Parts had to be molded to the finished dimensions since secondary operations, such as cutting or sanding, generally resulted in breakage. This reason alone, caused a high cost per part. Also, these brittle materials tended to crumble with time and tended to have limited application due to the high let-through values, that is, only moderate short circuit performance.

While many patents expound a wide variety of current limiting plastics, the usual actual commercial material is carbon black in a matrix of polyethylene thermoplastic. This material is not only brittle, but also tends to oxidize over time, even if antioxidants have been added to the polymer. The high operating temperatures of the environment where current limiting polymers are used additionally accelerates the oxidation of the polyethylene. Polyethylene is used as the commercial matrix material, in part, because the PTC effect on many other materials is not clear, contrary to many patent teachings which suggest any resin is appropriate. J. Fournier et al. in *Jour. Materials Science Letters* "Positive temperature coefficient effect in carbon black/epoxy polymer composites" 16 (1997) pp 1677–1679, describe carbon black/polyethylene PTC materials, the principle for the PTC effect of a carbon black/epoxy resin prepolymer matrix. The epoxy resin used was the diglycidyl ether of bisphenol A ("DGEBA", specifically DER 332, sold commercially by Dow Chemical) with either isophorene diamine ("IPD") or triethylene tetramine ("TETA") hardeners. They found that 18–20 wt. % carbon black provided the best PTC effect. But that such effect was difficult to predict because of the small thermal expansion of the matrix when heated. The nature of the carbon particles in the epoxy system was also thought to strongly influence the PTC effect. R. Strumpler et al. in *Materials Research Society Symp. Proc.* "Correlation of Electrical, Dielectric and Mechanical Properties of Polymer Composites" Vol. 411, 1996 pp. 393–398 describe problems with PTC behavior of metallic particle filled epoxies due to the shrinkage of the epoxy during cross-linking and the build up of internal stresses that result in a lower interparticle contact resistance.

Much of the lack of predictability in conductive polymer blends stems from the lack of understanding of the mechanism(s) responsible for the PTC effect. Material type, combination, and process parameters have been shown to greatly influence the PTC effect. The predominant theory for the PTC effect is thermal expansion of the polymer matrix. However, there are many examples, Fournier et al. and Strumpler et al., showing that PTC effect does not correlate with thermal expansion of the polymer. This is explained by the type of hardness and particle shape/size of the conductive filler as well as the internal stress built-up in the polymer during the molding process. All these factors, plus other unknowns, lead to the current lack of predictability when explaining this class of materials. However, the material characteristics can be reliably reproduced.

Such problems with epoxy resins may be why Sadhir et al., in PCT Publication WO 99/30329, teach intermixing discretely distributed thermoplastic material and conductive material in an epoxy matrix, where the epoxy and thermoplastic are substantially immiscible, providing thermally stable compositions exhibiting PTC behavior. The preferred materials therefor are a mixture of crystalline, oxidized polyethylene and an epoxy resin combination such as a diglycidylether of bisphenol A having an epoxy equivalent weight of 170–180 (DER-332 sold commercially by Dow Chemical) and a diglycidylether of neopentylglycol, crosslinked by a borontrifluoride complex, dicyanodiamide, or preferably, an anhydride. This, however, provides a fairly complicated system requiring careful matching of ingredients, although it does utilize, in part, epoxy resins, which are known to have outstanding electrical and molding characteristics.

What is needed, however, are current limiting polymers that are a mixture of readibly commercially available materials, such as epoxy resins, that exhibit a PTC effect and that are flexible and moldable, can be finished, are not brittle upon cure, and that are cuttable or punchable so they can be inexpensively volume produced in long sheet form.

SUMMARY OF THE INVENTION

Therefore, it is one of the main objects of this invention to provide an epoxy based current-limiting material which is moldable, and not brittle upon cure so that it can be finished if necessary.

It is also one of the main objects of this invention to provide an epoxy based current-limiting material which can be cast as a thin film (about 40 cm×80 cm and between 0.05 cm and 0.5 cm, usually 0.13 cm (0.05 inch) thick, and then cut into smaller component pieces for example 6.1×4.0×0.12 cm thick (2.4 inch×1.6 inch×0.05 inch) without fracturing.

These and other objects of the invention are accomplished by providing an electrically conducting material exhibiting superior flexibility and punchability, electrical conductivity characteristics; and low let-through (that is, the measure of effectiveness of the current limiter in reducing current and the duration of the current, typically less than $10 \times 10^3$ $A^2$ sec), for use in a current limiting PTC polymer device, consisting essentially of the cured reaction product of: a resin component comprising a mixture of: 100 parts by weight of a short chain aliphatic diepoxide resin and 0 to 15 parts by weight of a bisphenol A epoxy resin, 80 to 150 parts by weight of conductive filler, and curing agent. Preferably the aliphatic diepoxide is the diglycidyl ether of an alkylene glycololigomer, the bisphenol A epoxy resin is present in the range of 1 to 10 parts by weight to add strength to the material, and the curing agent is a borontrifluoride-amine complex. In some instances when no epoxidized bisphenol A epoxy is present a minor amount, about 2 to 20 parts by weight, of an epoxidized polybutadiene may be present.

This new material overcomes many problems associated with the previous state-of-the-art materials. This new flexible material greatly reduces manufacturing costs, has a significantly better short-circuit performance, and has a greater lifetime than previous materials used in high power current-limiting applications. Lowering the polymer vaporization temperature produced faster switching times resulting in decreased let-through. Also, because of the conformability of the new flexible polymer with the electrodes, let-through values have been reduced. Thus, it is possible to achieve the desired low device resistance with reduced forces on the electrodes due to the new material properties, which translate to lower let-through values.

Increased "flexibility", that is, the ability to be cut, pressed, punched or the like after final cure without fracture, crumbling or breaking, as, for example, punching 1 cm×2 cm×½ cm thickness pieces from a thin sheet 26 cm×26 cm×½ cm thickness without cracking are achievable. Also, let-through values below $10 \times 10^3$ (Amp$^2$ sec), in devices rated for 1.94 A/cm$^2$ are achievable, as well as all the other epoxy resin electrical and physical virtues well known in the art. The term "punchability" is to be equated with cuttability and both are related to the "flexibility" of the material. The invention also resides in a current limiting PTC polymer device comprising at least two electrodes and the previously described resin/filler/curing agent combination therebetween in contacting relationship.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the spirit and scope of the appended claims. In the drawings.

DETAILED DESCRIPTION OF THE PREFERRED EMBODIMENTS OF THE INVENTION

The current limiting PTC polymer of the invention are characterized by having a high flexibility and low let-through. One aspect of the invention provides an electrical device which comprises (a) a conductive polymer composition strip comprising a polymer with conductive particles dispersed therein, where outside surfaces of said conductive polymer composition strip can be enriched with additional conductive particles, and (b) at least two electrodes attached to said outside surfaces of the conductive polymer composition strip.

Such devices are characterized by being relatively conductive when used as a circuit component carrying normal current but which exhibit a very sharp increase in resistivity and reversibly transform into being relatively non-conductive when the temperature of the device increases above a switching temperature or switching temperature range, $T_s$, due to resistive Joule heating ($I^2R$) generated from a fault current. The electrical devices of the invention are particularly useful in PTC elements in electrical circuit protection devices. The conductive polymer compositions can be surface treated to provide at least two conductive particle enriched surfaces. Such surface treatment entails etching of the surfaces of the conductive polymer compositions to be enriched.

Figure 1:
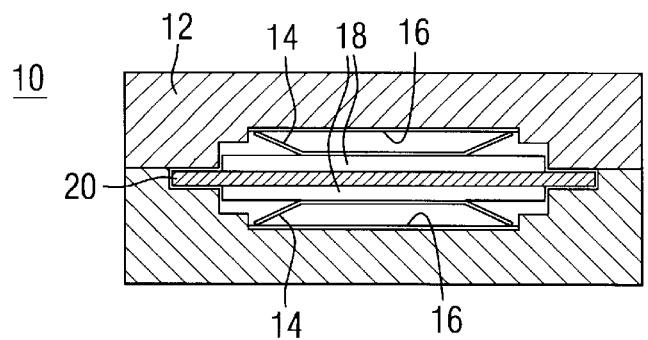
FIG. 1 is a cross-sectional drawing of one type of a current limiting polymer device utilizing spring pressure contact.
Figure 2:
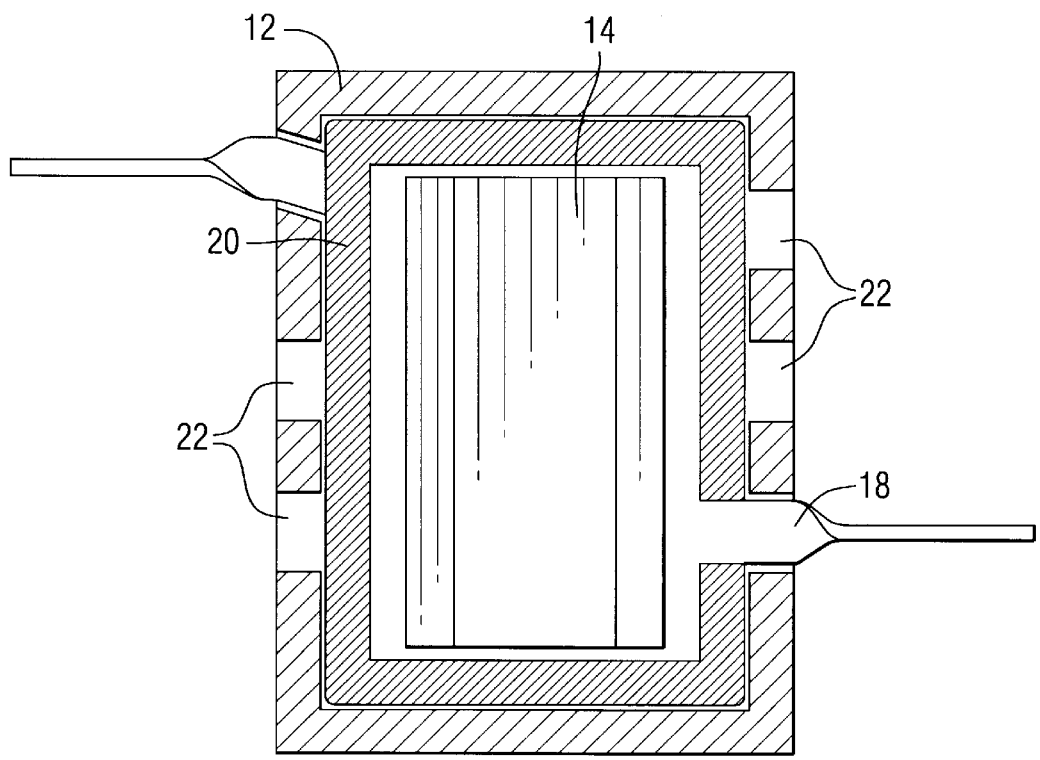
FIG. 2 is a top view of the device shown in FIG. 1.
Figure 3:
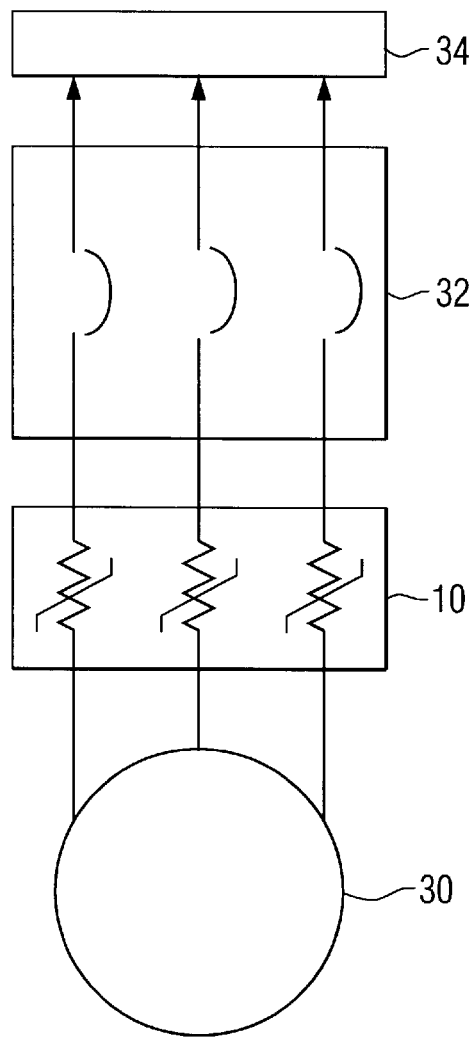
FIG. 3 is a schematic diagram of one use of the conductive polymer current-limiting device of this invention in conjunction with a three phase circuit breaker.

Referring now to FIG. 1, where one type of a low voltage current-limiting resistance device 10 is shown, for providing electrical circuit protection for electrical apparatus. Within metal or plastic case 12, shown split into two parts, are metal bifold springs 14, resting on polyethylene terephthalate (Mylar) sheets 16, and supporting copper electrodes 18 on each side of a thin polymeric sheet of conductive current limiting polymer composition 20 which exhibits PTC behavior. FIG. 2 shows a top view of FIG. 1, where vents 22 are shown and the springs 14 and electrodes 18 are further detailed. Other type springs, such as wave or compression springs could be used to provide the contacting relationship between the electrodes 18 and the PTC polymer 20. Other package sizes, shapes and electrode/conductive polymer connections are considered within this invention. FIG. 3 shows the conductive polymer current-limiting resistance device 10, where a plurality (here three) of conductive polymer plates are connected electrically in series between load 30 and the three-phase circuit breaker device 32, with current source shown as 34. As the current limiting polymer composition 20 in device 10 undergoes a sharp increase in resistivity due to a large influx of current, its temperature will rise above its switching temperature $T_s$ at which a rapid increase in its resistance takes place to transform it to a high resistance state.

The polymers suitable for use in preparing the conductive polymer compositions of this invention cannot contain thermoplastic materials such as commonly used polyethylene polymers. Most, if not all of which thermoplastic materials when highly loaded with conductive filler (for example greater than or equal to 50 wt % carbon black), have low flexibility and high let-through values, as well as poor punchability and the characteristic of generally crumbling with time. The electrically conducting material of this invention will have a resin component primarily of a short chain aliphatic diepoxide and optionally, but preferably, a minor amount of bisphenol A epoxy resin. The aliphatic diepoxide will preferably be a diglycidyl ether of ethylene, propylene, or butylene glycol oligomer of low viscosity, between about 20 to 500 centipoise ("cp") at 25° C. with an epoxy equivalent weight range of from about 165 to 450. The preferred material is the diglycidyl ether of propylene glycol oligomer [propylene glycol di(2,3-epoxy-propyl)ether] shown below, where n=3–10, preferably 4 (DER 736 sold commercially by Dow Chemical):

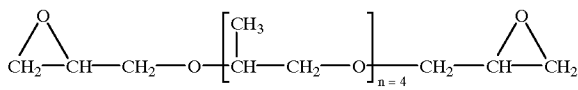

Preferably a bisphenol A epoxy resin will be present in the range of from 1 to 10 parts by weight ("pw") per 100 pw aliphatic diepoxide. This bisphenol A epoxy should have high crosslinking, providing added integrity and strength to the epoxy component. Over about 15 pw per 100 pw aliphatic diepoxide, the cured resin will be brittle, and not easily capable of being cut or punched from a large sheet, dramatically reducing commercial usefulness. The useful bisphenol A epoxy will be a liquid, generally high viscosity (over about 10,000 cps. at 25° C.) diglycidylether of bisphenol A having an epoxy equivalent weight range of from about 170 to 250:

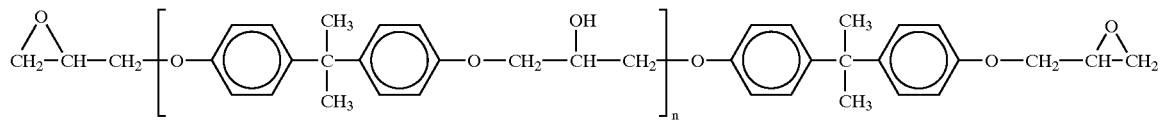

Where n=0 to 1, preferably n=0.15 to 0.2 (DER 331 sold commercially by Dow Chemical)
This is a general purpose epoxy resin. Too high an n value results in semi-solid material which may be difficult to mix with the other epoxy component. As can be seen, the epoxy rings provide excellent crosslinking and good physical properties upon cure.

The preferred curing agent is effective amounts of a borontrifluoride-amine complex. It was found to cure quickly and completely with minor addition. Borontrifluoride ($BF_3$)-monoethylamine and triethanolamine complexes are both well known and useful. Other curing agents that can be used include anhydrides such as nadic methyl anhydride or dodecenyl succinic anhydride, which impart flexibility to cured compositions. Other curatives include amidoamines such as a derivative of ricinoleic acid and an aliphatic polyamine. Dicyanodiamide was also found to be a useful curative. Various accelerators, such as Fenuron ($C_6H_5$—NH—CO—N($CH_3$)$_2$, MW=164.21, sold as UR300 by SKW Trostberg) and Curezol imidazole (sold as 2MA by Air Products), as well as stabilizers to prevent premature gelation of the resinous admixture, can also be used. An elastomer such as epoxidized polybutadiene can also be used in minor amounts to increase flexibility, especially when no bisphenol A epoxy is present.

The conductive particles suitable for use can include, for example, conductive carbon black, graphite, carbon fibers, metal powders, that is, nickel, tungsten, silver, iron, copper, etc., or alloy powders, that is, nichrome, brass, conductive metal salts, and conductive metal oxides; with carbon black, graphite and carbon fibers being preferred; carbon black being most preferred. The conductive particles are distributed or dispersed in the epoxy, to form conductive chains in the epoxy under normal temperature conditions. Usually, carbon black particles are dispersed in the polymer preferably in the amount of from about 70 to 120 pw, most preferably 90 to 110 pw, per 100 pw epoxy component, while metal fillers are usually used in the range of 300 pw to 100 pw epoxy component. The conductive particles preferably have a particle size from about 0.01 to 200 micrometers, most preferably from about 0.02 to 25 micrometers. The particles can be of any shape, such as flakes, rods, spheroids, etc., preferably spheroids. The amount of conductive particles incorporated into the polymer matrix will depend on the desired resistivity of the current limiting PTC polymer device. In general, greater amounts of conductive particles in the polymer will result in a lower resistivity for a particular polymeric material.

Only these components previously described can be used to provide the flexible material of this invention. The criticality of these components is thought to be the combination of the optimum amounts of these materials that allows: easy moldability; relatively low modulus (softness) and some elastic deformation of the cured material which provides low interfacial resistance between the material and the electrodes and also good workability of the material (cutting, stamping, folding without breaking) which are better than the physical properties of thermoplastic based conductive polymers; and dimensional stability of the cured material due to its three-dimensional crosslinking. This crosslinking prevents creep and the slow decline in thickness while under pressure, which, unlike thermoplastics, prevents performance degradation.

The invention will now be further clarified by consideration of the following non-limiting examples:

EXAMPLE 1

The following current limiting polymer compositions were admixed in parts by weight as shown in Table 1:

| Sample | alkylene glycol oligomer DER736 | Bisphenol A Epoxy DER331 | Epoxidized Polybutadiene PBD 600 | Curing Agent Dicyandiamide | Curing Agent/ $BF_3$ Amine Leecure B-1550 | Accelerator UR300 | Stabilizer BYK-A 500 (Drops of Liq.) | Carbon Black XC-72 |
|---|---|---|---|---|---|---|---|---|
| 1 | 34.12 | 0.00 | 14.63 | 0.00 | 1.24 | 0.00 | 3 | 49.98 |
| 2 | 43.87 | 0.00 | 4.89 | 0.00 | 1.23 | 0.00 | 3 | 49.98 |
| 3 | 43.84 | 2.45 | 2.44 | 0.00 | 1.25 | 0.00 | 3 | 49.98 |
| 4 | 46.73 | 2.47 | 0.00 | 0.00 | 1.26 | 0.00 | 3 | 49.50 |
| 5 | 43.86 | 4.88 | 0.00 | 0.00 | 1.24 | 0.00 | 3 | 49.98 |
| 6 | 39.02 | 4.92 | 4.88 | 0.00 | 1.27 | 0.00 | 3 | 49.89 |
| 7 | 41.73 | 4.66 | 0.00 | 2.92 | 0.00 | 0.74 | 3 | 49.91 |
| 8 | 44.11 | 2.34 | 0.00 | 2.84 | 0.00 | 0.73 | 3 | 49.95 |
| 9C* | 37.09 | 9.27 | 0.00 | 2.92 | 0.00 | 0.76 | 3 | 49.95 |
| 10C* | 42.75 | 4.75 | 0.00 | 0.00 | 2.38 | 0.00 | 3 | 50.09 |
| 11C* | 40.41 | 4.81 | 2.43 | 0.00 | 2.41 | 0.00 | 3 | 49.91 |
| 12C* | 23.31 | 23.28 | 0.00 | 2.87 | 0.00 | 0.74 | 3 | 49.81 |
| 13C* | 0.00 | 46.41 | 0.00 | 2.92 | 0.00 | 0.74 | 3 | 49.91 |
| 14C* | 46.42 | 0.00 | 0.00 | 2.92 | 0.00 | 0.74 | 3 | 49.91 |

*COMPARATIVE EXAMPLES; Samples based on a total weight of 283 grams.
DER 736-Tradename for the diglycidyl ether of propylene glycol oligomer sold by Dow Chemical.
DER 331-Tradename for a liquid diglycidyl ether of bisphenol A sold by Dow Chemical.
PBD 600-Tradename for epoxidized polybutadiene sold by Elf Alto-Chemie.

Leecure B-1550-Tradename for a $BF_3$-amine complex sold by LeePoxy Inc. UR 300-Tradename for an accelerant sold by SKW Trostberg. XC-72-Tradename for carbon black conductive filler sold by Cabot Corp. BYK-A 500 is a mixture of naphtha and methoxypropanol acetate in a 12:1 ratio.

The wt% of ingredients based on 100 parts DER 736, as well as flexibility measurements and let-through measurements are shown in Table 2, for the Samples of Table 1.

TABLE 2

| X | Sample | DER736 | DER331 | B-1550 | XC-72 | Cure Time (Minutes) | Let-Through × $10^3(A^2s)$ | Workability |
|---|---|---|---|---|---|---|---|---|
| 2.93 | 1 | 100 | 0.0 | 3.6 | 146.4 | 20 | 12.3 | Good |
| 2.28 | 2 | 100 | 0.0 | 2.8 | 113.9 | 20 | 14.3 | Good |
| 2.28 | 3 | 100 | 5.6 | 2.8 | 113.9 | 20 | 12.1 | Good |
| 2.14 | 4 | 100 | 5.3 | 2.7 | 105.9 | 20 | 14.8 | Good |
| 2.28 | 5 | 100 | 11.1 | 2.8 | 113.9 | 30 | 8.5 | Good |
| 2.56 | 6 | 100 | 12.6 | 3.3 | 127.7 | 30 | 10.0 | Good |
| 2.40 | 7 | 100 | 11.2 | 0.0 | 119.8 | 60 | 5.7 | Good |
| 2.27 | 8 | 100 | 5.3 | 0.0 | 113.4 | 60 | Not Tested | Good |
| 2.70 | 9C* | 100 | 25.0 | 0.0 | 134.9 | 60 | 13.0 | Stiff |
| 2.34 | 10C* | 100 | 11.1 | 5.6 | 117.2 | 20 | Not Tested | Warped** |
| 2.48 | 11C* | 100 | 11.9 | 6.0 | 123.8 | 60 | Not Tested | Warped** |
| 4.29 | 12C* | 100 | 100 | 0.0 | 213.7 | 60 | 19.9 | Brittle |
| 2.16 | 13C* | 0 | 100 | 0.0 | 107.8 | 60 | 16.2 | Brittle |
| 2.15 | 14C* | 100 | 0.0 | 0.0 | 107.3 | 60 | 7.8 | Very Soft |

*COMPARATIVE EXAMPLES, **Warped and cracked due to excessive curative.

All the samples were formulated and mixed generally as follows:

A mixture was made of pre-weighted epoxy resins, initiators and other additives. To this mixture, a portion of the conductive filler, usually approximately ⅓ of the total content was blended into the mixture by hand. This preliminary formulation was then transferred to a high intensity mixer (Brabender Plasti-Corder model PL2100 manufactured by Brabender Instruments, Inc.) where the rest of the conductive filler was added in small portions. The rotational speed, depending on the types of materials being mixed, ranged from 2 rpm to 35 rpm and the total mixing time was typically 9 minutes to 20 minutes. The material was then removed from the mixer and either stored in plastic bags for future use or molded immediately.

Samples were molded in a single cavity frame mold measure 6.2 cm×4.2 cm×0.127 cm. The following molding procedure was generally used for all samples: Press platens preheated to 130° C. to 170° C., preferably between 135° C.–150° C. Weigh out the appropriate amount of material. Distribute the weighed material evenly into the mold cavity. Place the assembled mold into the press. Apply a force of between 30,000 lbs to 60,000 lbs, preferably 60,000 lb for 10 minutes to 60 minutes, depending on the materials being molded. Finally, remove mold assembly and disassemble, remove part and allow to cool. All molding was performed on a Carver model 30-12, four-column 30-ton hydraulic press with process controlled resistively heated platens.

By "workability" (in Table 2) is meant a conductive polymer having flexibility, robustness, uniformity, and flatness which would allow for punching a molded part from a larger sheet (e.g., 12 inches×12 inches or larger). Material flexibility and robustness must be such that, when a sample is punched from a larger sheet, the edges are clean and not crumbly or cracked and the sample can be gently flexed by hand to approximately 30° from the parallel and not crack or break. The polymer must also not be too flexible like comparative example 14C* which was very flexible but tended to crumble on the edges. Also, a very flexible part could lead to "creepage" over time especially when pressure is applied. Creepage being a dimensional change in the polymer due to an applied force on the polymer. This could lead to a reduction in performance and ultimately to device failure.

The other factors that also went into determining workability were the uniformity and flatness of the sample. The flatter and more uniform the surface, measured visually and by measuring sample resistance, indicated the consistency and reproductibility of the mixing and molding process and more importantly the desired ratio of materials. The flatness of the sample was found to greatly depend on the type and amount of curative. The faster the cure time and the flatter the part the better. Sample flatness and uniformity was quantified by measuring the resistance of the sample in the fixture shown in FIGS. 1 and 2. Even though the dicyanodiamide curative did produce flat moldable samples it had to be cured longer than the BF$_3$ curative. Also, important to workability was the amount of curative used especially for the BF$_3$ curative. There was an optimum amount of BF$_3$ curative that provided the desired flexibility, robustness, and flatness desired. Too much curative, comparative example 10C* and 11C* (5.6 and 6.0 pwph 736 resin respectively) showed warpage and cracking due to excessive curative. comparative example 10C* and 11C* (5.6 and 6.0 pwph 736 resin respectively) showed warpage and cracking due to excessive curative.

By adjusting the ratio of DER 736 to DER 331 we were able to tailor the flexibility to our desired specification. Too high an amount of DER 331 lead to a brittle part which could possibly be molded but would shatter or crack when punched.

Figure 4:
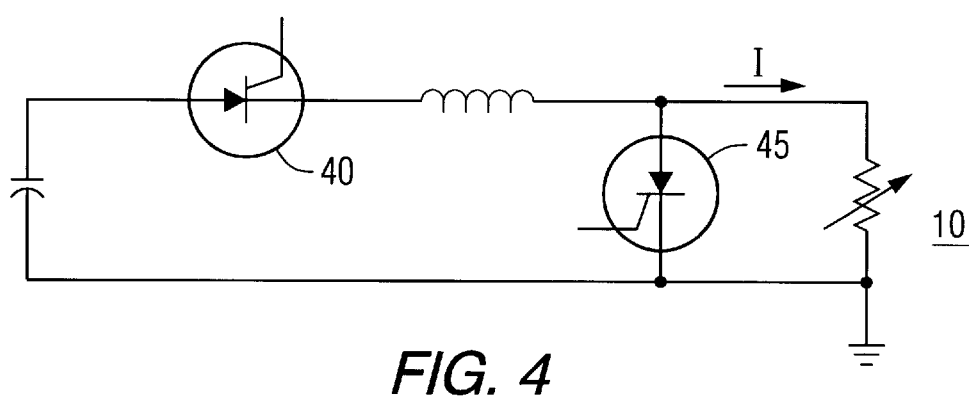
FIG. 4 is a schematic diagram of the device circuit used to test let-through performance of conductive polymers in the Examples.

Let-through was measured by applying a short circuit fault current to the polymer samples that where connected to the circuit as shown in FIG. 4, where 40 shows the solid state close-in switch used to initiate the current and 45 shows the crowbar switch used to stop current flow. The samples were housed in a fixture 10 as shown, like the one illustrated in FIGS. 1 and 2. A data acquisition (Nicolet Multipro) system was used to acquire the current (I) through the sample and voltage (V) across the sample. The area of the samples was approximately 4 cm×5.6 cm. Spring force, applied by springs 14 shown in FIG. 1, in the range of 30 lbs to 60 lbs force was used to hold the electrodes on the sample. The let-through was calculated by integrating the square of the current over a time from the start of current to the end of the acquisition, that is $\int I^2 dt$=let-through.

As can be seen in Samples 1 through 5, if a bisphenol A epoxy is not used, as in Samples 1 and 2, then a flexibilizer such as epoxidized polybutadiene can be used with a BF$_3$-amine complex curing agent, instead of dicyanodiamide, to prevent a crumbly product with no moldability. As shown in Samples 3, 4 and 5 excellent results accrue with moderate amounts of bisphenol A epoxy. Favorable results are shown in Samples 1 through 8 and not in Samples 9C through 13C because either there was too high a ratio of bisphenol A epoxy or too high an amount of curative. Excess bisphenol A lead to stiff and brittle samples that either would crack in molding, or crack in the punching process, or fractured during the let-through test. Similarly, when the amount of BF$_3$-amine complex curative exceeded an optimum amount, the samples warped and cracked during molding due to a higher degree of crosslinkages formed and possibly a faster reaction rate. Too little curative resulted in incomplete crosslinking and resulted in a crumbly sample. The optimum degree of flexibility can be tailored in an epoxy-based system by being able to balance the ratio of the resins and curative. This is not possible with a thermoplastic.

EXAMPLE 2

Additional comparative examples besides samples 9C–13C are shown below in Table 3:

| Sample | Polymer Composition | Parts | Carbon Black Parts | Cure Time (Minutes) | Let-Through × 10$^3$(A$^2$s) | Workability |
|---|---|---|---|---|---|---|
| 14C* | Vinyl Ester/Styrene | 100 | 100 | 10 | 34.0 | Brittle |
| 15C* | High Density Poly Ethylene | 100 | 100 | n/a | ≅56 | Brittle |

*COMPARATIVE EXAMPLES

As shown above thermoplastics are melt processed and their characteristics cannot be tailored like an epoxy. Thermoplastics need to be combined with a thermoset similar to what was done in PCT publication WO 99/3029 in order to gain the versatility of an epoxy-based system. Also, thermoplastics tend to have a faster oxidation rate and higher creepage than most thermoset materials making them unsuitable for long-term use as current-limiting polymers, especially at elevated ambient temperatures.

We claim:

1. An electrically conducting material exhibiting improved flexibility for use in a current limiting PTC polymer device, consisting essentially of the cured reaction product of:
   (A) a resin component comprising a mixture of:
      (i) 100 parts by weight of a diepoxide resin selected from the group consisting of the diglycidyl ether of ethylene glycol oligomer, the diglycidyl ether of propylene glycol oligomer, and the diglycidyl ether of butylene glycol oligomer,
      (ii) 0 to 15 parts by weight of a bisphenol A epoxy resin, and
      (iii) 0 to 20 parts by weight of an epoxidized polybutadiene
   (B) 80 to 150 parts by weight of a conductive filler, and
   (C) a curing agent,
where, if no bisphenol A epoxy is present, at least 2.0 parts by weight of epoxidized polybutadiene is added to component (i) and wherein the electrically conducting material exhibits positive temperature coefficient of resistance behavior.

2. The electrically conducting material of claim 1, where the bisphenol A epoxy resin is present in the range of 1 to 10 parts by weight and is effective to add strength and toughness to the material, and the diepoxide resin has a viscosity between about 20 to about 500 centipoise at 25° C. and an epoxy equivalent weight range of from about 165 to 450.

3. The electrically conducting material of claim 1, where the curing agent is a borontrifluoride-amine complex.

4. The electrically conducting material of claim 1, also containing from 2.0 to 20 parts by weight of an epoxidized polybutadiene, to replace or be in combination with the bisphenol A epoxy resin.

5. The electrically conducting material of claim 1, where the filler is carbon particles.

6. The electrically conducting material of claim 1, cast as a film having a thickness between 0.1 cm and 0.5 cm, said film being flexible.

7. The electrically conducting material of claim 1, where the diepoxy is the diglycidyl ether of propylene glycol having the formula

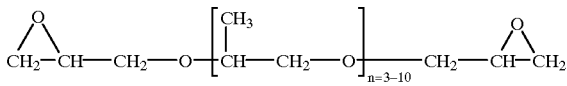

the bisphenol A epoxy resin is a high viscosity diglycidyl ether of bisphenol A having an epoxy equivalent weight of from about 150 to 250 and is present in the range of from 1 to 10 parts by weight, the curing agent is a borontrifluoride-amine complex and the filler is carbon particles, and where no polyethylene is present.

8. The electrically conducting material of claim 7, cast as a film having a thickness between 0. 1 cm and 0.5 cm, said film being flexible.

9. A current limiting PTC polymer device containing at least two electrodes with electrically conducting material therebetween in contacting relationship, where the electrically conducting material consists essentially of the cured reaction product of:

(A) a resin component comprising a mixture of:
   (i) 100 parts by weight of a diepoxide resin selected from the group consisting of the diglycidyl ether of ethylene glycololigomer, the diglycidyl ether of propylene glycololigomer and the diglycidyl ether of butylene glycololigomer, and
   (ii) 0 to 15 parts by weight of a bisphenol A epoxy resin
(B) 80 to 150 parts by weight of conductive filler, and
(C) curing agent, where the electrically conducting material exhibits positive temperature coefficient of resistance (PTC) behavior.

10. The current limiting PTC polymer device of claim 9, where springs provide the contacting relationship between the electrodes and the electrically conducting material.

11. The current PTC limiting PTC device of claim 9 where the diepoxide is the diglycidyl ether of propylene glycol, and where from 2.0 to 20 parts by weight of an epoxidized polybutadiene is added to the resin component, to replace or be in combination with the bisphenol A epoxy resin.

12. The current PTC limiting PTC device of claim 9 where the bisphenol A epoxy resin is present in the range of 1 to 10 parts by weight and is effective to add strength and toughness to the material, and the diepoxide resin has a viscosity between about 20 to about 500 centipoise at 25° C. and an epoxy equivalent weight range of from about 165 to 450.

13. The current limiting PTC device of claim 9, where the curing agent is a borontrifluoride-amine complex.

* * * * *